(12) United States Patent
Chen et al.

(10) Patent No.: US 8,681,206 B2
(45) Date of Patent: Mar. 25, 2014

(54) 3D IMAGE CAPTURE DEVICE AND SYMMETRIC PRISM ARRAY FOR THE SAME

(75) Inventors: Chien-Yue Chen, Yunlin County (TW); Zhi-Sheng Cheng, Yunlin County (TW); Qing-Long Deng, Taipei (TW)

(73) Assignee: National Yunlin University of Science and Technology, Douliu, Yunlin County (TW)

( * ) Notice: Subject to any disclaimer, the term of this patent is extended or adjusted under 35 U.S.C. 154(b) by 737 days.

(21) Appl. No.: 12/551,903

(22) Filed: Sep. 1, 2009

(65) Prior Publication Data
US 2011/0050858 A1 Mar. 3, 2011

(51) Int. Cl.
*H04N 13/02* (2006.01)
(52) U.S. Cl.
USPC .............................................. 348/49
(58) Field of Classification Search
USPC ................. 348/42–54, 131, 167–168; 359/687–692
See application file for complete search history.

(56) References Cited

U.S. PATENT DOCUMENTS

| | | | | |
|---|---|---|---|---|
| 7,439,938 | B2 * | 10/2008 | Cho et al. | 345/1.3 |
| 2002/0154215 | A1 * | 10/2002 | Schechterman et al. | 348/51 |
| 2006/0279732 | A1 * | 12/2006 | Wang et al. | 356/326 |
| 2007/0252954 | A1 * | 11/2007 | McGuire et al. | 353/20 |

* cited by examiner

*Primary Examiner* — Chirag R Patel
(74) *Attorney, Agent, or Firm* — Muncy, Geissler, Olds & Lowe, P.C.

(57) ABSTRACT

The present invention discloses a 3D image capture device and a symmetric prism array for the same. The symmetric prism array comprises a plurality of right triangle prisms, wherein the longer legs of the right triangle prisms are arranged along an identical line on the incident plane, and wherein the right triangle prisms are left-right symmetric with respect to a central symmetry line, and wherein the normals of the hypotenuses of the right triangle prisms diverge from the central symmetry line. The symmetric prism array that captures light from two different directions is arranged in front of the lens of the 3D image capture device, whereby the 3D image capture device can capture images from two different directions simultaneously. After the image processing by the 3D image capture device, 3D images are presented.

10 Claims, 7 Drawing Sheets

3D IMAGE CAPTURE DEVICE AND SYMMETRIC PRISM ARRAY FOR THE SAME

FIELD OF THE INVENTION

The present invention relates to a 3D image capture device, particularly to a 3D image capture device, which can simultaneously capture images from two different directions.

BACKGROUND OF THE INVENTION

The multimedia has been evolved from audio and planar images to 3D (3 dimensional) images. As a 3D image makes us feel as if we were right in the scene, it has very high potential in communication, multimedia entertainment, etc.

At present, if one intends to have a 3D image of an object, he has to take pictures of the object from different view angles. Capturing the images of different view angles may be realized via a single-lens device or a double-lens device.

Refer to FIG. 1 for a conventional double-lens 3D camera. Simulating two eyes of human being, the conventional double-lens 3D camera has two lens assemblies 1 horizontally arranged and captures the images of an object via the two lens assemblies 1. However, the volume and weight of the lens assemblies of the double-lens 3D camera doubles that of a single-lens camera. Therefore, the conventional double-lens 3D camera is less competent in price and portability.

Refer to FIG. 2 for a conventional single-lens camera. To achieve a 3D image with a single-lens camera 2, one has to move the single-lens camera 2 horizontally to respectively take two pictures of an identical object at two different positions. However, such a method has to control the horizontal movement of the single-lens camera precisely so that the captured images can have a minimum parallactic error and achieve an optimized 3D effect. Refer to FIG. 3. Alternatively, a prism 4 is arranged in front of a lens 3 of a single-lens camera. Via the refraction of the prism 4, the single-lens camera can form two images having parallax of an identical object on a single photograph in a single shot, whereby a 3D image can be constructed.

However, the additional prism makes the single-lens camera have a massive volume and is hard to adapt to a miniaturized image capture device. Besides, the prism requires high precision, which causes a high price and impairs the application to various image capture devices.

SUMMARY OF THE INVENTION

The primary objective of the present invention is to provide a symmetric prism array, which can receive images (light) from two different angles and has a lower fabrication cost.

Another objective of the present invention is to provide a 3D (3 dimensional) image capture device using a symmetric prism array, wherein the 3D image capture device captures images of an object from two different angles simultaneously and processes the images to form a 3D image.

To achieve the abovementioned objectives, the present invention proposes a symmetric prism array, which comprises a plurality of right triangle prisms, wherein the longer legs of the right triangle prisms are arranged along an identical line on an incident plane, and wherein the right triangle prisms are left-right symmetric with respect to a central symmetry line, and wherein the normals of the hypotenuses of the right triangle prisms diverge from the central symmetry line.

The symmetric prism array captures light from two different directions and is arranged in front of the lens of the 3D image capture device, whereby the 3D image capture device can capture images from two different directions simultaneously. After the images are processed by the 3D image capture device, 3D images are presented.

DETAILED DESCRIPTION OF THE PREFERRED EMBODIMENTS

Below, the embodiments are described in detail in cooperation with the drawings to make easily understood the objectives, characteristics and accomplishments of the present invention.

Figure 1:
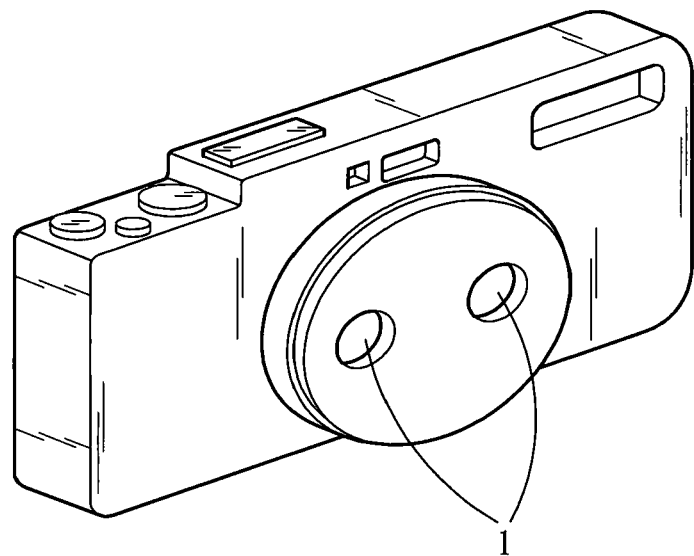
FIG. 1 is a diagram schematically showing a conventional double-lens 3D camera.
Figure 2:
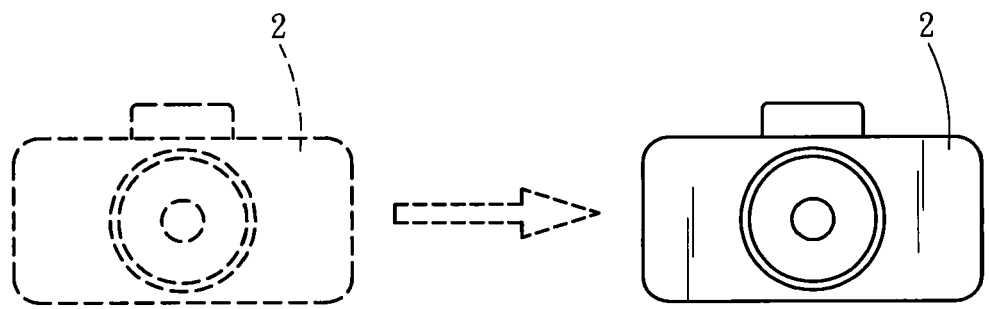
FIG. 2 is a diagram schematically showing that a conventional single-lens camera takes two pictures of an identical object at two different positions.
Figure 3:
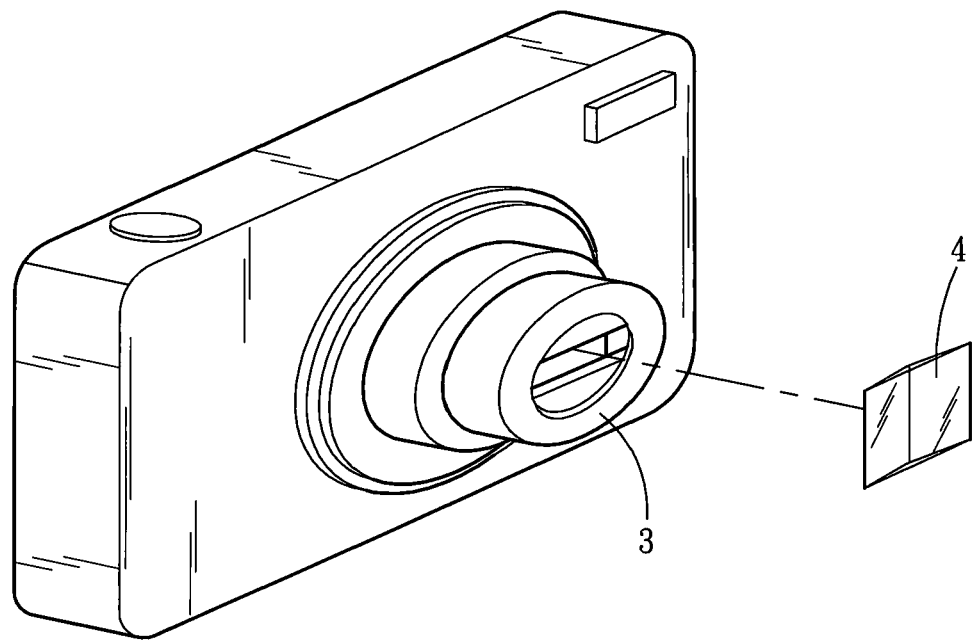
FIG. 3 is a diagram schematically showing that a prism is arranged in front of a lens of a conventional single-lens camera.
Figure 4:
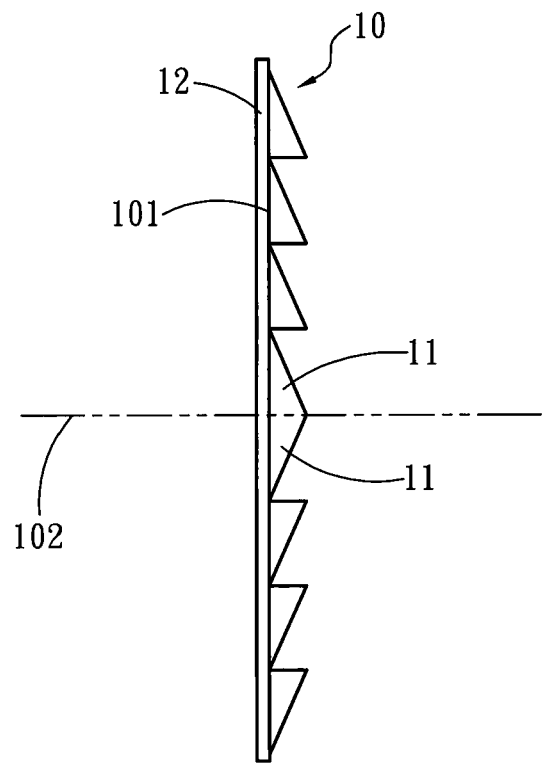
FIG. 4 is a top view schematically showing a symmetric prism array according to the present invention.

Refer to FIG. 4. The symmetric prism array 10 of the present invention comprises a plurality of right triangle prisms 11 and a flat glass 12, wherein the longer legs of the right triangle prisms 11 are arranged along an identical line on the incident plane 101 and stuck onto the flat glass 12, and wherein the right triangle prisms 11 are left-right symmetric with respect to a central symmetry line 102, and wherein the normals of the hypotenuses of the right triangle prisms 11 diverge from the central symmetry line 102.

Figure 5:
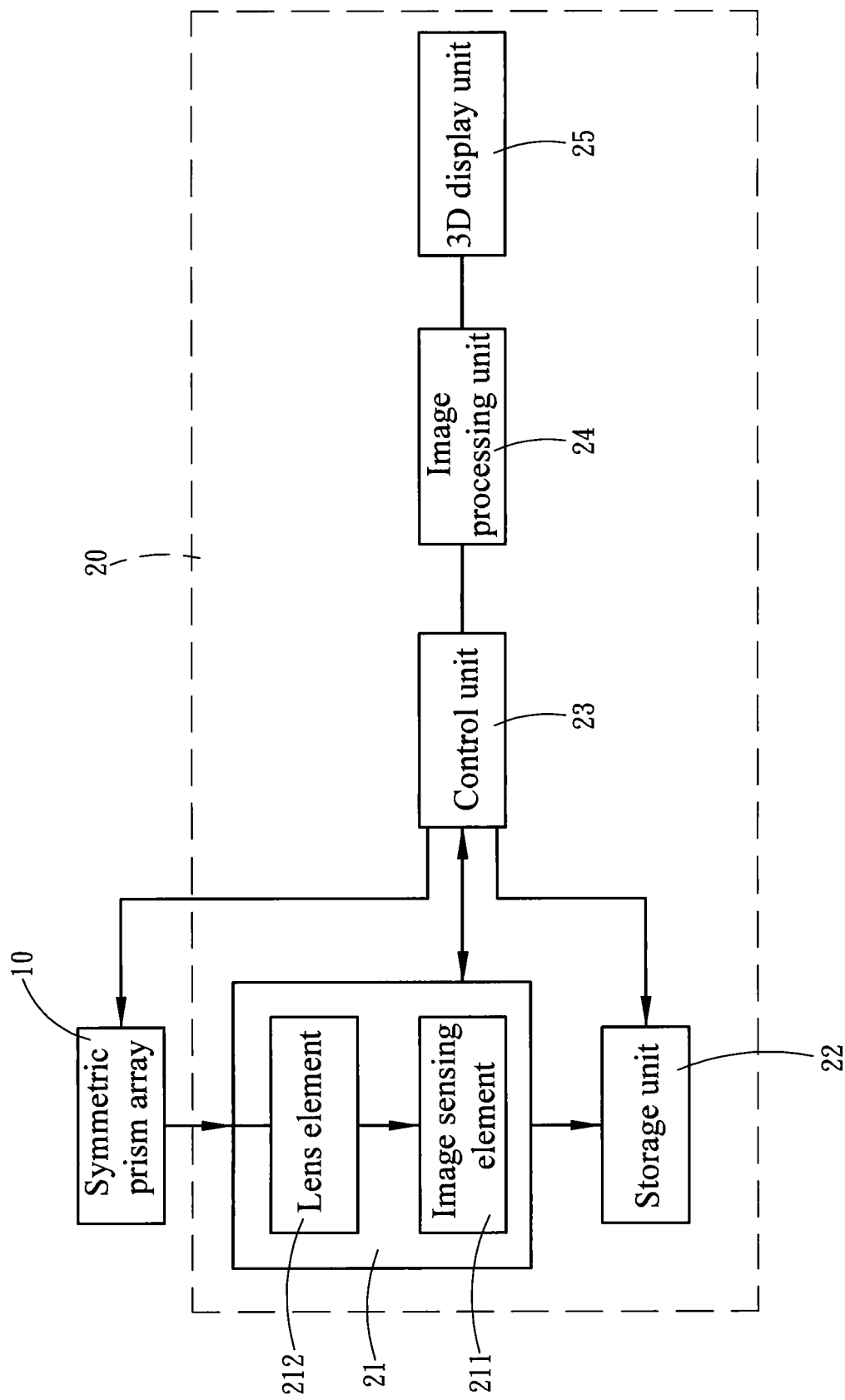
FIG. 5 is a block diagram schematically showing the architecture of a 3D image capture device according to the present invention.
Figure 6:
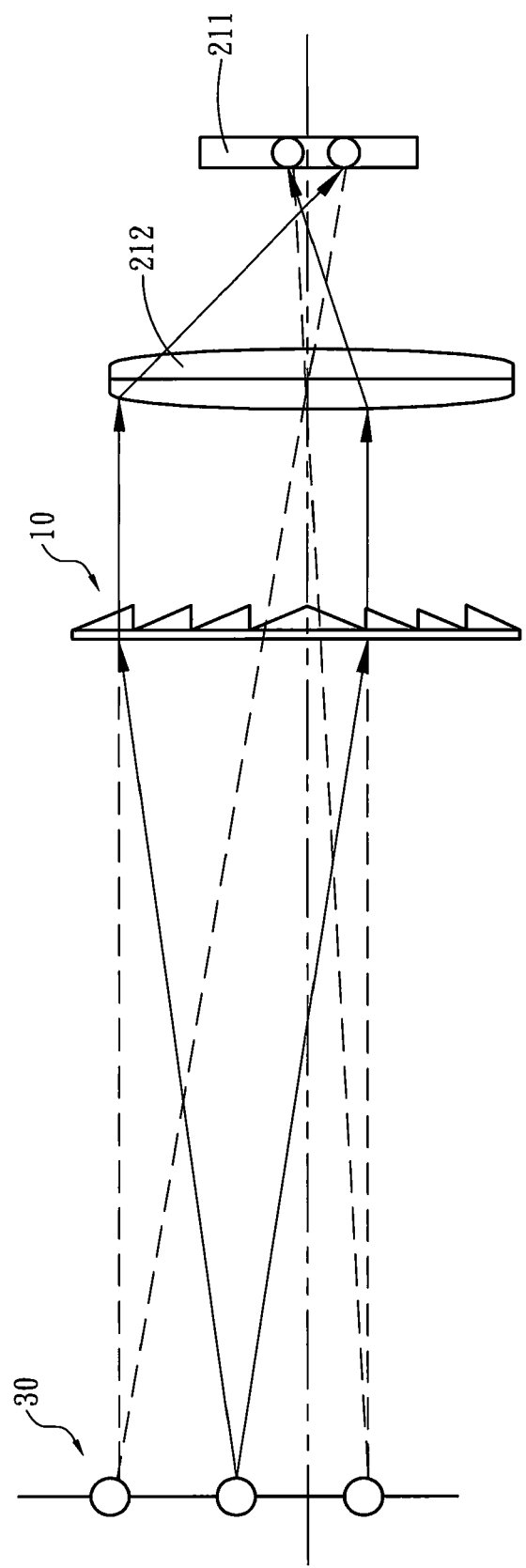
FIG. 6 is a diagram schematically showing the operation of a 3D image capture device according to the present invention.

Refer to FIG. 5 and FIG. 6. The symmetric prism array 10 is applied to a 3D image capture device 20 for capturing a 3D image of an object 30. The 3D image capture device 20 comprises an image capture unit 21, a storage unit 22, a control unit 23, an image processing unit 24 and a 3D display unit 25.

The image capture unit 21 further comprises an image sensing element 211 and a lens element 212. The image sensing element 211 may be a CCD (Charge Coupled Device) or a CMOS (Complementary Metal Oxide Semiconductor). The symmetric prism array 10 is installed and faces the lens element 212 of the image capture unit 21. The lens element 212 focuses light and forms images on the image sensing element 211. The storage unit 22 is connected to the image capture unit 21. The control unit 23 is connected to the storage unit 22 and the image capture unit 21.

The symmetric prism array 10 captures the images of the object 30 from two different directions and inputs the images to the image capture unit 21. The lens element 212 focuses light and forms images on the image sensing element 211. The control unit 23 captures an image pair data and stores the image pair in the storage unit 22. The image processing unit 24 processes the data of the image pair to obtain a 3D image. The 3D display unit 25 presents the 3D image.

Figure 7:
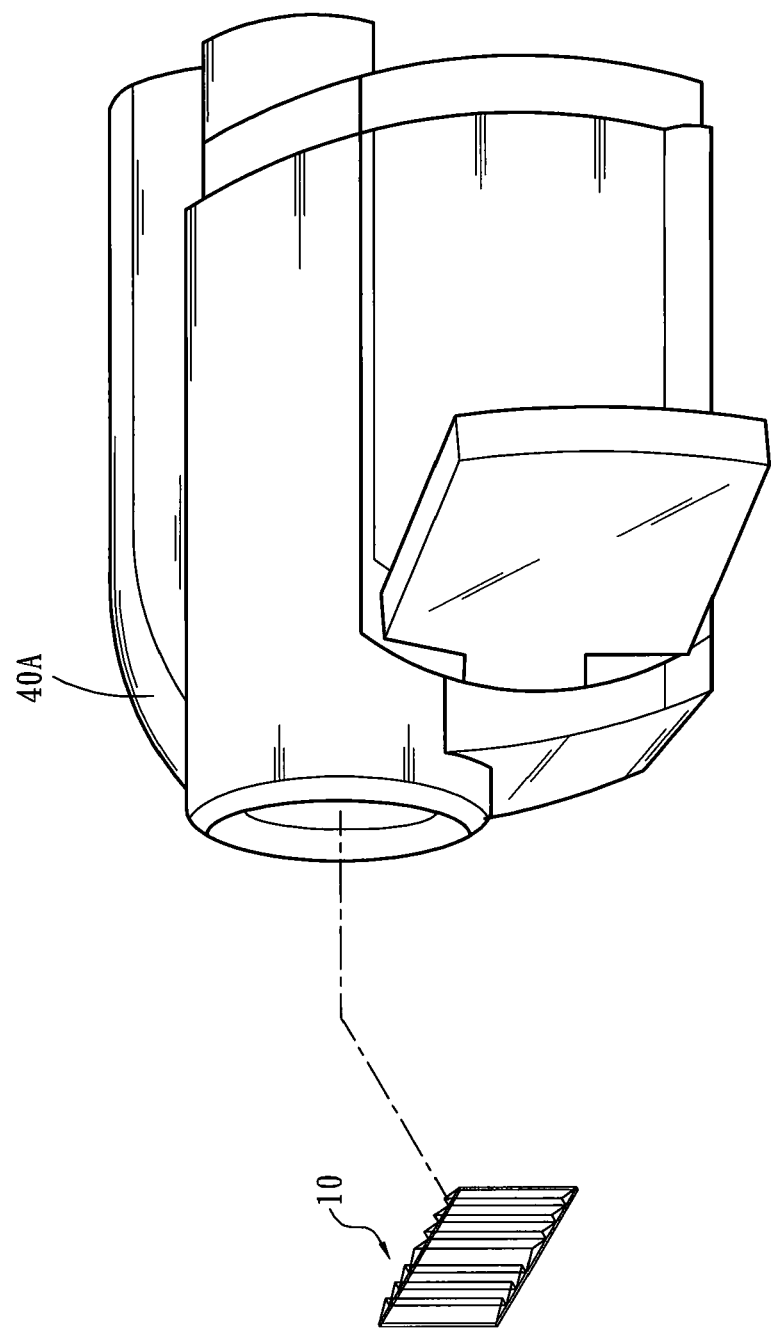
FIG. 7 is a diagram schematically showing one embodiment of a 3D image capture device according to the present invention.

Refer to FIG. 7. The 3D image capture device 20 may further comprise a housing 40A accommodating the image capture unit 21, the storage unit 22, the control unit 23, and the image processing unit 24. The housing 40A may be a housing of a video camera. In other words, the present invention can apply to a video camera and enables the video camera to shoot 3D images.

Figure 8:
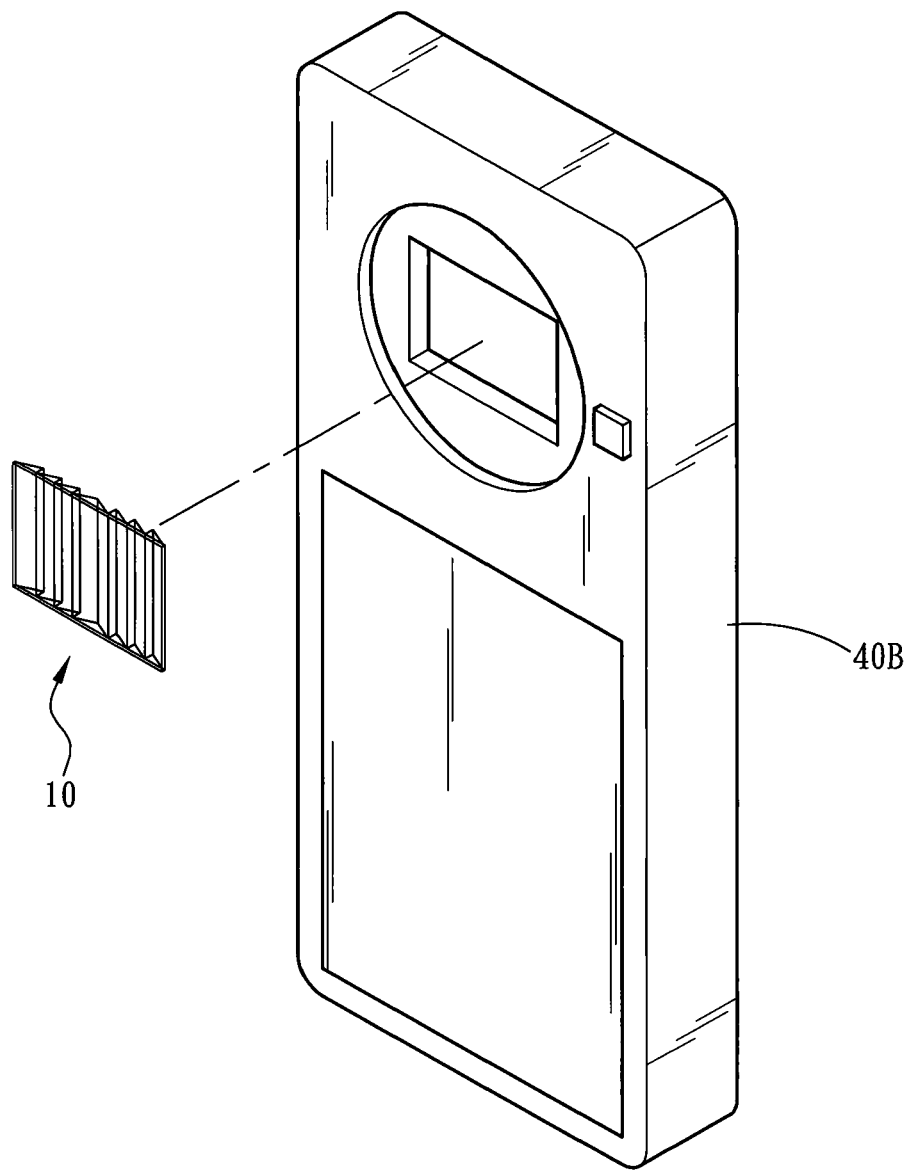
FIG. 8 is a diagram schematically showing another embodiment of a 3D image capture device according to the present invention.
Figure 9:
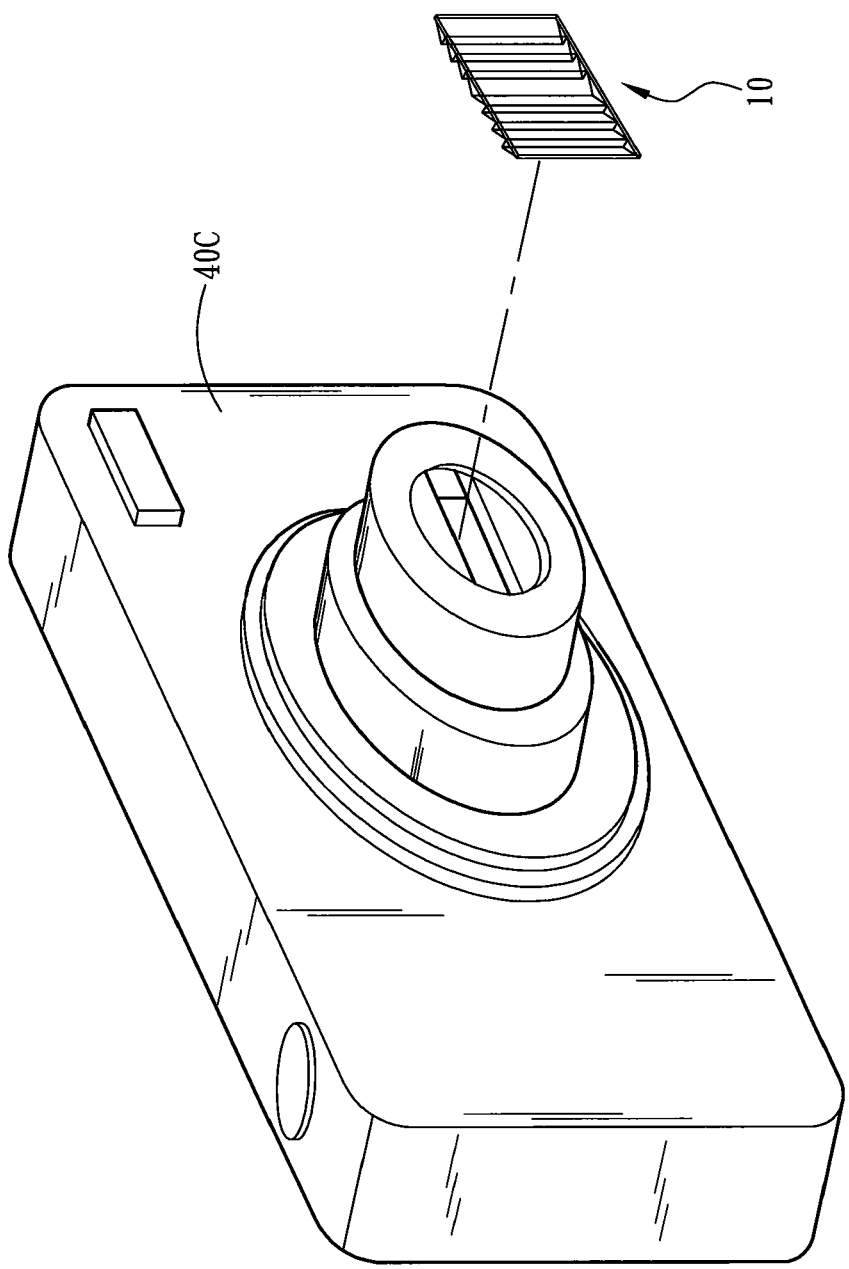
FIG. 9 is a diagram schematically showing a further embodiment of a 3D image capture device according to the present invention.

Refer to FIG. 8 and FIG. 9. Alternatively, the 3D image capture device 20 may further comprise a housing 40B of a mobile phone or a housing 40C of a camera or a housing of an informational device able to install the 3D image capture device 20. Therefore, the present invention can enable various informational devices of the 3D image capture device 20 to shoot 3D images.

In conclusion, the present invention discloses a 3D image capture device 20 using a symmetric prism array 10. The symmetric prism array 10 captures light from two different directions. In other words, the 3D image capture device 20 can capture images from two different directions simultaneously. Therefore, the image pair captured by the 3D image capture device 20 is free of parallactic error. After image processing by the 3D image capture device 20, a 3D image is presented. Further, the symmetric prism array 10 is a micro-optical structure, which can be easily and cost-efficiently miniaturized for the application to various image capture devices.

What is claimed is:

1. A symmetric prism array, comprising:
   a first refracting portion, comprising a plurality of first right triangle prisms, wherein longer legs of said first right triangle prisms are arranged along an identical line on an incident plane, and
   a second refracting portion, comprising a plurality of second right triangle prisms which are corresponding to the first right triangle prisms, wherein longer legs of said second right triangle prisms are arranged along the identical line on the incident plane, and
   wherein said first right triangle prisms and said second right triangle prisms are left-right symmetric with respect to a central symmetry line, and wherein normals of hypotenuses of said first right triangle prisms diverge from said central symmetry line and normals of hypotenuses of said second right hand triangle prisms diverge from said central symmetry line.

2. The symmetric prism array according to claim 1 further comprising a flat glass, wherein said right triangle prisms are stuck onto said flat glass.

3. A 3D image capture device, which captures a 3D image of an object, comprising:
   a symmetric prism array including a first refracting portion and a second refracting portion, wherein said first refracting portion comprises a plurality of first right triangle prisms, and wherein longer legs of said first right triangle prisms are arranged along an identical line on an incident plane, wherein said second refracting portion comprises a plurality of second right triangle prisms which are corresponding to the first right triangle prisms, and longer legs of said second right triangle prisms are arranged along the identical line on the incident plane, and wherein said first right triangle prisms and said second right triangle prisms are left-right symmetric with respect to a central symmetry line, and wherein normals of hypotenuses of said first right triangle prisms diverge from said central symmetry line and normals of hypotenuses of said second right triangle prisms diverge from said central symmetry line;
   an image capture unit including an image sensing element and a lens element, wherein said symmetric prism array is installed and faces said lens element of said image capture unit and longer legs of said first right triangle prisms face said object and longer legs of said second right triangle prisms face said object, and wherein said lens element focuses light and forms images on said image sensing element;
   a storage unit connected to said image capture unit;
   a control unit connected to said storage unit and said image capture unit, wherein said symmetric prism array captures images of said object from two different directions and inputs said images to said image capture unit, and wherein said lens element focuses light and forms images on said image sensing element, and wherein said control unit captures an image pair data and stores said image pair data in said storage unit; and
   an image processing unit processing said image pair data to obtain a 3D image.

4. The 3D image capture device according to claim 3, wherein said image sensing element is a CCD (Charge Coupled Device).

5. The 3D image capture device according to claim 3, wherein said image sensing element is a CMOS (Complementary Metal Oxide Semiconductor).

6. The 3D image capture device according to claim 3 further comprising a 3D display unit presenting said 3D image.

7. The 3D image capture device according to claim 3 further comprising a housing accommodating said image capture unit, said storage unit, said control unit, and said image processing unit.

8. The 3D image capture device according to claim 7, wherein said housing is a housing of a mobile phone.

9. The 3D image capture device according to claim 7, wherein said housing is a housing of a camera.

10. The 3D image capture device according to claim 7, wherein said housing is a housing of a video camera.

* * * * *